United States Patent [19]

Yagi et al.

[11] 4,373,043
[45] Feb. 8, 1983

[54] COLOR DEEPENING AGENT

[75] Inventors: Kazuhisa Yagi, Wakayama; Sho Suzuki, Funabashi; Norihiko Nakashima, Wakayama, all of Japan

[73] Assignee: Kao Soap Co., Ltd., Tokyo, Japan

[21] Appl. No.: 285,697

[22] Filed: Jul. 22, 1981

[30] Foreign Application Priority Data

Feb. 13, 1981 [JP] Japan ................... 56/20325

[51] Int. Cl.$^3$ .................. C08K 5/54; C08K 5/53; C08K 5/42; C08K 5/09
[52] U.S. Cl. .................. 524/130; 524/165; 524/188; 524/262; 524/263; 524/267; 524/319; 524/366; 524/457; 528/71
[58] Field of Search ............ 260/29.2 TN, 29.6 NR; 528/71; 524/130, 165, 188, 262, 263, 267, 319, 366, 457

[56] References Cited

U.S. PATENT DOCUMENTS 3,684,759 8/1972 Reiff et al. ............. 260/29.6 NR
3,836,493 9/1974 Matsuda et al. ........... 260/29.2 TN Primary Examiner—J. L. Schofer
Assistant Examiner—Bernard Lipman
Attorney, Agent, or Firm—Flynn, Thiel, Boutell & Tanis

[57] ABSTRACT

A color deepening agent comprises (a) an aqueous resin composition obtained by polymerizing a monomer having a polymerizable unsaturated bond, in the presence of a polyurethane emulsion having a thermosetting reactivity, the refractive index of a dry film of said aqueous resin composition being lower than 1.50, and (b) at least one compound selected from the group consisting of silicon compounds and fluorine compounds.

23 Claims, No Drawings

COLOR DEEPENING AGENT

The present invention relates to a color deepening agent for fibrous products. More particularly, the present invention relates to a color deepening agent for improving the coloring property of dyed fibrous products by enhancing the deepness and sharpness of the color.

A serious defect of synthetic fibers, especially polyester fibers, is the poor deepness or sharpness of the color of dyed fibrous products made of such synthetic fibers, in comparison with the deepness or sharpness of the color of dyed fibrous products made of natural fibers, such as wool and silk fibers. Accordingly, research has been conducted for improving the deepness or sharpness of the color of dyed fibrous products made of synthetic fibers, and some proposals have been reported.

For example, "Dyes and Chemicals", Vol. 15, No. 1, pages 3-8 (1970) explains experimentally and theoretically that because the color of a dyed fabric is observed to be deep and sharp when it is wetted with water (having a refractive index of 1.33), if a dyed fabric is treated with a resin processing agent having a low refractive index, a color deepening effect can be obtained which is similar to that attained by wetting the dyed fabric with water. It is taught that the reason for this effect is that the surface reflectivity is reduced by this treatment. In "Fiber Engineering", Vol. 26, No. 3, page 188, in the summary of the discussion entitled "Fiber Surface and Dyeability", it is taught that in order to enhance the coloring effect by reducing the reflection of the surface layer and thereby increasing the quantity of light that is transmitted into the interiors of fibers, in dyeing polyester fibers with a disperse dye, the formation of a layer having an appropriate refractive index on the fiber surface is effective and if dyed PET filaments are coated with a low polymer of trifluorochloroethylene (having a refractive index of 1.4), the color can be deepened.

Various proposals based on these facts have been made. For example, Japanese Patent Application Laid-Open Specification No. 111192/78 discloses a fibrous structure having a film formed of a polymer having a refractive index of lower than 1.50 and a process for the preparation of such a fibrous product which comprises charging a monomer capable of forming a polymer having a refractive index lower than 1.5, in a closed vessel together with fibers and forming a film by plasma polymerization or discharge graft polymerization. Furthermore, Japanese Patent Application Laid-Open Specification No. 26232/80 discloses a process comprising adsorbing a compound having a refractive index of lower than 1.45 in the form of a film on the surface of a fibrous structure in an amount of 0.3 to 10 wt. %, based on the weight of the fibers, and subjecting the fibrous structure to a dry heat treatment or a wet heat treatment. It is taught that a fluorine resin, acrylic acid ester resin, vinyl polymer or silicone resin having a refractive index of lower than 1.45 can be used as the starting film-forming material. As a specific embodiment of this process, there is disclosed a process in which an emulsion or solvent solution of a fluorine-containing compound or an acrylic acid ester is adsorbed, by dipping or spray-coating, on a fiber structure at a high temperature and the thus-treated fibrous structure is subjected to a dry heat treatment or wet heat treatment to form a film on the fibers.

However, the process disclosed in Japanese Patent Application Laid-Open Specification No. 111192/78 is not completely satisfactory in various points. For example, the manufacturing efficiency is low because a batch operation is employed, and a special installation of equipment is necessary. Furthermore, because the polymer formed by the polymerization adheres to the vessel wall, the polymer loss is great and a troublesome operation of cleaning the vessel should be conducted. Accordingly, this process is not suitable for industrial production. In the process disclosed in Japanese Patent Application Laid-Open Specification No. 26232/80, wherein a dipping treatment is carried out at a high bath ratio, uniform adsorption of the film-forming material on the fibrous structure can scarcely be attained if the bath temperature is not high, and therefore a large quantity of the solution must be heated to a high temperature, with the result being that an energy-saving effect cannot be attained and the manufacturing cost is increased. In the case where spray coating is carried out, dangerous and troublesome operations are required, and furthermore, because a uniform coating cannot readily be obtained, there is a serious risk that a heterogeneous and uneven product will be formed.

We conducted research with a view to developing a color deepening method which can be carried out simply, on an industrial scale, without encountering the above-mentioned disadvantages or loss of energy and which can provide a good finish film. We found that the dipping method and the pad-dry-cure method are more excellent as regards the ease of controlling the adsorption quantity and from the viewpoints of the apparatus and operational efficiency. We conducted further research with a view to developing a color deepening agent which is capable of forming a uniform film on the fiber surface, using a low-temperature resin bath so as to reduce the amount of energy required. We discovered an aqueous resin composition capable of satisfying these requirements. We have now completed the present invention based on this discovery.

In accordance with the present invention, there is provided a color deepening agent comprising, as critical components, (a) an aqueous resin composition obtained by polymerizing a monomer having a polymerizable unsaturated bond, in the presence of a polyurethane emulsion having a thermosetting reactivity, the refractive index of a dry film made of said aqueous resin composition being lower than 1.50, and (b) at least one compound selected from the group consisting of silicon compounds and fluorine compounds.

The color deepening agent in accordance with the present invention comprises, as critical components, (a) a cationic or an anionic aqueous resin composition obtained by radical polymerization of a polymerizable monomer capable of forming a polymer having a refractive index of lower than 1.50, or a mixture of such monomers, in the presence of a cationic or an anionic polyurethane emulsion having a thermosetting reactivity, which polyurethane emulsion is obtained by reacting a urethane prepolymer having a terminal isocyanate group with a compound having an amino group and, if desired, reacting the latter reaction product with a hydrophilic agent, and (b) at least one compound selected from the group consisting of silicon compounds and fluorine compounds.

A cationic polyurethane emulsion having a thermosetting reactivity, which can be used in the present invention, is prepared by the following procedure. A urethane prepolymer (A) having a terminal free isocyanate group, which prepolymer is prepared from a polyhydroxyl compound and an excess amount of a polyisocyanate, is reacted with an excess amount of a polyalkylene polyamine, preferably in a ketone type solvent, to form a polyurethane urea polyamine (B), and the resulting reaction product is reacted with an epihalohydrin and then mixed with an aqueous solution of an acid to obtain a cationic self-emulsifiable polyurethane emulsion. Furthermore, a cationic self-emulsifiable polyurethane emulsion, which can be used in the present invention, can be obtained (I) by reacting the above-mentioned urethane prepolymer (A) with a polyalkylene polyamine derivative having at least 2 primary or secondary amino groups and at least 1 functional group represented by the formula —CH$_2$—CH(OH)—CH$_2$X, in which X stands for Cl or Br, and mixing the reaction product with an aqueous solution of an acid or (II) by reacting a part of the free amino groups of said polyurethane urea polyamine (B) with a blocked polyisocyanate having one free isocyanate group, with blocked polyisocyanate is obtained from a polyisocyanate and an isocyanate blocking agent, and mixing the reaction product with an aqueous solution of an acid. An anionic polyurethane emulsion having a thermosetting reactivity can also be prepared according to the following procedure. A urethane prepolymer (A) having a terminal free isocyanate group, which prepolymer is obtained from a polyhydroxyl compound and an excess amount of a polyisocyanate, is reacted with an excess amount of a polyalkylene polyamine, preferably in a ketone type solvent, to form a polyurethane urea polyamine (B). The resulting reaction product is reacted with an epihalohydrin and then with a cyclic polyvalent carboxylic acid anhydride and the latter reaction product is mixed with an aqueous solution of a basic substance to obtain an anionic self-emulsifiable polyurethane emulsion. Furthermore, the anionic polyurethane emulsion can also be prepared (I) by reacting the urethane prepolymer (A) with a polyalkylene polyamine derivative having at least two primary or secondary amino groups and at least one functional group represented by the formula —CH$_2$—CH(OH)—CH$_2$X, in which X stands for Cl of Br, reacting the latter reaction product with a cyclic polyvalent carboxylic acid anhydride and then mixing the reaction product with an aqueous solution of a basic substance or (II) by reacting a part of the free amino groups of the polyurethane urea polyamine (B) with a blocked polyisocyanate compound having one free isocyanate group, which blocked polyisocyanate compound is obtained from a polyisocyanate and an isocyanate blocking agent, reacting the latter reaction product with a cyclic polyvalent carboxylic acid anhydride and then mixing the reaction product with an aqueous solution of a basic substance.

The color deepening agent of the present invention comprises an aqueous resin composition prepared according to the foregoing procedures, which is capable of forming a polymer having a refractive index of lower than 1.50, as the sole critical component or as one of the critical components.

As the polyisocyanate used to make the urethane prepolymer (A), there can be mentioned aromatic and aliphatic polyisocyanates, such as 1,5-naphthylene diisocyanate, 4,4-diphenylmethane diisocyanate, 4,4-diphenyldimethylmethane diisocyanate, di- and tetraalkyldiphenylmethane diisocyanates, 4,4-dibenzoyl isocyanate, 1,3-phenylene diisocyanate, 1,4-phenylene diisocyanate, toluene diisocyanate, chlorinated isocyanates, brominated isocyanates, phosphorus-containing isocyanates, butane-1,4-diisocyanate, hexane-1,6-diisocyanate, dicyclohexylmethane diisocyanate, cyclohexane-1,4-diisocyanate, xylene diisocyanate and lysine diisocyanate. These polyisocyanates can be used in combination with triisocyanates, such as 1-methylbenzole-2,4,6-triisocyanate, biphenyl-2,4,4'-triisocyanate and triphenylmethane triisocyanate.

The polyhydroxyl compound used to make the urethane prepolymer (A) has a molecular weight of from 200 to 10,000. Known polyhydroxyl compounds conventionally used for production of polyurethanes, such as polyethers, polyesters, polyester amides, polyacetals, polythioethers and polybutadiene glycols, can be used. Furthermore, there can be used bisphenol A and glycols obtained by adding alkylene oxides, such as ethylene oxide and propylene oxide, to bisphenol A.

As the polyethers, there can be mentioned homopolymers, copolymers and graft copolymers of tetrahydrofuran, ethylene oxide, propylene oxide and butylene oxide, and homogeneous polyethers and mixed polyethers obtained by condensation of hexane diol, methylhexane diol, heptane diol and octane diol. Moreover, there can be used propoxylated and ethoxidized glycols.

A condensation product of a thioglycol or a mixture of a thioglycol with another glycol is especially preferred as the polythioether. As the polyacetal, there can be mentioned, for example, a water-insoluble polyacetal obtained from hexane diol and formaldehyde or from 4,4-dihydroxyethoxydiphenyldimethylmethane and formaldehyde. As typical examples of the polyesters, there can be mentioned polyester polyglycols prepared by the dehydrating condensation reaction of a saturated or unsaturated low-molecular-weight glycol, such as ethylene glycol, propylene glycol, 1,3-butane diol, 1,4-butane diol, neopentyl glycol, pentane diol, hexane diol, octane diol, 2-ethyl-1,3-hexane diol, 1,4-butyne diol, bisphenol A, diethylene glycol or dipropylene glycol with a dibasic acid, and a polyester glycol obtained by ring-opening polymerization of a cyclic ester compound. Glycols customarily used together with the above-mentioned polyhydroxyl compounds, such as ethylene glycol, diethylene glycol, triethylene glycol, butane diol, propane diol, 1,6-hexane diol, neopentyl glycol, N-alkyldiethanol amines having an alkyl group having 11 to 22 carbon atoms and an ethylene oxide or propylene oxide adduct of bisphenol A, can be used in combination with the polyhydroxyl compounds in the present invention.

Preparation of the urethane prepolymer (A) is carried out in the presence or absence of a solvent. When an aromatic polyisocyanate is used, a reaction temperature of 70° to 100° C. is employed and when an aliphatic or alicyclic polyisocyanate is used, a reaction temperature of 70° to 130° C. is employed. It is preferred that the amount of the polyisocyanate is selected so that all of the hydroxyl groups of the polyhydroxyl component are reacted. Accordingly, it is preferred that the ratio of the total number of isocyanate groups to the total number of reactive hydrogen atoms is in the range of from 1.1/1.0 to 5.0/1.0.

In the present invention, as the polyalkylene polyamine, there can be used polyalkylene polyamines inclusive of polyethylene polyamines, polypropylene polyamines and polybutylene polyamines. Namely, there are used polyamines in which the nitrogen atoms are connected through intermediate groups of the formula —$C_nH_{2n}$—, in which n is an integer larger than 1 and the number of these connecting groups is from 2 to about 4. The nitrogen atoms can be connected to adjacent carbon atoms in the group —$C_nH_{2n}$— but they are not bonded to the same carbon atom. Not only polyamines such as diethylene triamine, triethylene tetramine, tetraethylene pentamine and dipropylene triamine, but also mixtures of these polyamines and crude polyamine materials can be used. Furthermore, hydroxyalkyl-substituted polyamines can be used in combination with the foregoing polyamines.

In some cases, in order to charge the density of the hydrophilic groups in the polyurethane emulsion used in the present invention or to increase the number of hydrogen atoms of the substituted urea linkage, it is preferred that the space between the amino groups in the polyurethane urea polyamine molecule be increased. This object can be attained by replacing a part of the polyalkylene polyamine by hydrazine, ethylene diamine, propylene diamine, hexamethylene diamine, piperazine, phenylene diamine, an alkyl substituted diamine thereof (substituted by an alkyl group having 1 to 22 carbon atoms), or an alkylene oxide, acrylonitrile or acrylic acid ester adduct thereof. Ordinarily, this object can be attained by replacing up to about 50 wt. % of the polyalkylene polyamine by one or more of the above-named materials.

It is preferred that the reaction between the urethane prepolymer (A) having a terminal isocyanate group and the polyalkylene polyamine is carried out under atmospheric pressure, in a ketone-type solvent, at a reaction temperature of from $-20°$ to $70°$ C. As the ketone solvent, there can be mentioned acetone, methylethyl ketone, diethyl ketone, dipropyl ketone, methylisobutyl ketone and methylisopropyl ketone. Among these ketones, acetone and methylethyl ketone are preferred. A mixture of such a ketone-type solvent with benzene, tetrahydrofuran, dioxane, an acetic acid ester, dimethylformamide or a chlorine-containing solvent can be used. The reaction time is determined taking into account the reaction temperature and the reactivity of the polyisocyanate compound, and a longer or shorter reaction time can be used according to these reaction conditions. The terminal point of the reaction can be confirmed by the fact that an absorption, owing to the isocyanate group, is not detected at 2250 cm$^{-1}$ in the infrared absorption spectrum of the reaction mixture. Ordinarily, the reaction is completed within 0.5 to 2 hours.

In the reaction between the urethane prepolymer (A) and the polyalkylene polyamine, it is critical that the total number of the primary and secondary amino groups be larger than the number of the isocyanate groups. As the mole number of the total amino groups becomes close to the mole number of the total isocyanate groups, a polyurethane urea polyamine having a high molecular weight is formed, but a gelled product or a product having a large gelation tendency is formed. If the molar ratio of the amino groups is greatly increased, the molecular weight of the polyurethane urea polyamine is reduced and when there is used a polyurethane emulsion prepared by using such a low-molecular-weight product as an intermediate, a resin having excellent properties cannot be obtained from a resin emulsion or latex obtained by radical polymerization of a monomer having a polymerizable unsaturated bond. Accordingly, the ratio of the total number b of the primary and secondary amino groups to the total number a of the isocyanate groups is adjusted to be in the range of $1 < b/a \leq 5$, preferably $1 < b/a \leq 3$. It is preferred that the molecular weight of the polyurethane urea polyamine (B) be 1,000 to 100,000.

Preparation of the cationic self-emulsifiable polyurethane emulsion having a thermosetting reactivity from the thus-prepared polyurethane urea polyamine (B), as the intermediate, is accomplished by reacting the polyurethane urea polyamine with an epihalohydrin in an amount of 0.2 to 1.0 mole per mole of the free amino groups of the polyurethane urea polyamine (B) and then mixing the reaction product of the preceding step with an aqueous solution of an acid. Epichlorohydrin and epibromohydrin are preferred as the epihalohydrin. The reaction conditions are varied according to the kind of the polyurethane urea polyamine (B) that is used, but ordinarily, the reaction is carried out at a temperature of $20°$ to $70°$ C. for a reaction time of 0.5 to 5 hours. Aqueous solutions of inorganic acids and organic acids can be used. An aqueous solution of a monobasic acid, such as hydrochloric acid, nitric acid, acetic acid, propionic acid, monochloroacetic acid or glycolic acid, is especially preferred. The amount of the acid is preferably such that the pH value of the formed polyurethane emulsion is from about 5 to about 7.

Preparation of the anionic self-emulsifiable polyurethane emulsion having a thermosetting reactivity is accomplished by reacting the polyurethane urea polyamine (B) with an epihalohydrin, then reacting the reaction product of the preceding step with a cyclic polyvalent carboxylic acid anhydride at $5°$ to $70°$ C. for about 0.5 to about 2 hours and then mixing the reaction product with an aqueous solution of a basic substance. Epichlorohydrin and epibromohydrin are preferred as the epihalohydrin. The conditions for the reaction with the epihalohydrin are the same as those adopted for production of the cationic self-emulsifiable urethane emulsion. As the cyclic polyvalent carboxylic acid anhydride, there are preferably used cyclic dicarboxylic acid anhydrides, such as maleic anhydrides, succinic anhydride, phthalic anhydride, di-, tertra- and hexahydrophthalic anhydrides, trimellitic anhydride and itaconic anhydride. As the aqueous solution of a basic substance, there can be used aqueous solutions of hydroxides, carbonates and bicarbonates of alkali metals, such as sodium hydroxide, potassium hydroxide, sodium carbonate, sodium bicarbonate and potassium carbonate, and ammonia and lower amines represented by the formulae $RNH_2$, $R_2NH$ and $R_3N$, in which R stands for an alkyl group having 1 to 4 carbon atoms, a hydroxyethyl group or a hydroxypropyl group.

The organic solvent used for the reaction can be removed from the thus-obtained self-emulsifiable polyurethane emulsion by distillation, preferably under reduced pressure. Even if the organic solvent is removed by distillation, the stability of the emulsion is not reduced.

A polyalkylene polyamine derivative having at least two primary or secondary amino groups and at least one functional group represented by the formula —$CH_2$—$CH(OH)$—$CH_2X$, in which X stands for Cl or Br, can be used instead of the polyalkylene polyamine. As such derivative, there can be mentioned, for example, a compound represented by the following general formula (I):

R—A—CH$_2$—CH(OH)-CH$_2$X           (I)

wherein X stands for Cl or Br, A stands for a secondary or tertiary amino group, and R stands for an alkylene group having at least one primary or secondary amino group, with the proviso that at least two primary or secondary groups are included in the compound represented by the general formula (I).

The compound of the formula (I) is obtained by reacting the above-mentioned polyalkylene polyamine with an epihalohydrin, such as epichlorohydrin ro epibromohydrin. In this case, the ratio of the amounts of the polyalkylene polyamine and the epihalohydrin differs according to the number of amino groups contained in one molecule of the polyalkylene polyamine. This ratio should be selected so that at least two primary or secondary amino groups are contained in one molecule of the compound of the formula (I). Ordinarily, this reaction is preferably carried out at 10° to 80° C. for 0.5 to 5 hours.

A part of the free amino groups of the above-mentioned polyurethane urea polyamine (B) can be reacted with a blocked polyisocyanate compound having one free isocyanate group in the molecule, which is obtained from a polyisocyanate and an isocyanate blocking agent. As the polyisocyanate, there are preferably used the above-mentioned prepolymer (A) having a terminal isocyanate group and polyisocyanates described hereinbefore with respect to the preparation of the urethane prepolymer (A).

The term "isocyanate blocking agent" means an agent which reacts with some isocyanate groups of a polyisocyanate and which can then be separated from the isocyanate groups under certain conditions in order to restore the isocyanate groups again. In the present invention, in order to impart the reactivity of the isocyanate to the polymer, it is critical that the resin composition obtained as the final step should possess the reactivity of the isocyanate group. In the present invention, the polyisocyanate is reacted with the polyol to form a prepolymer, the resulting prepolymer is reacted with an excess amount of the polyalkylene polyamine to form a polyurethane urea polyamine and an aqueous resin composition is formed from the polyurethane urea polyamine through subsequent steps. In such polymer, free isocyanate groups are not allowed to remain in the polymer and exhibit the reactivity. Accordingly, isocyanate groups of the polyisocyanate are reacted with the isocyanate blocking agent so that the isocyanate groups are not reacted with the active hydrogen atoms of the polyalkylene polyamine or water. After preparation of the aqueous resin composition, the blocking agent is separated under certain conditions when the isocyanate reactivity is required. Thus, the isocyanate groups are produced again and the reactivity of the isocyanate groups is manifested in the resin composition. As the isocyanate blocking agent, there can be used, for example, acidic sodium sulfite, secondary amines, tertiary alcohols, amides, phenol, phenol derivatives, lactams (such as ε-caprolactam), oximes (such as methylethyl ketone oxime), cyanic acid, ethylene imine, glycidol, hydroxyamine, imines, mercaptans, pyrrolidones and malonic acid esters. In the reaction of the polyisocyanate with the isocyanate blocking agent, it is necessary to react the isocyanate blocking agent so that one isocyanate group should be left in the free state in the polyisocyanate. The thus-prepared blocked polyisocyanate having one free isocyanate group is reacted with the free amino groups of the polyurethane urea polyamine to such an extent that the final polymer can be dispersed in water. This reaction is carried out at a temperature of −20° to 70° C. for 0.5 to 2 hours.

A radical polymerizable compound can be used as the monomer having a polymerizable unsaturated bond in the present invention. For example, there can be mentioned fluorinated acrylic acid esters and fluorinated methacrylic acid esters, such as pentadecafluorooctyl acrylate ($n_D=1.339$), tetrafluoro-3-(pentafluoroethoxy)propyl acrylate ($n_D=1.35$), heptafluorobutyl acrylate ($n_D=1.367$), 2-(heptafluorobutoxy)ethyl acrylate ($n_D=1.39$), trifluoroisopropyl methacrylate ($n_D=1.42$) and 2,2,2-trifluoro-1-methylethyl methacrylate ($n_D=1.42$), vinyl ether compounds such as vinyl isobutyl ether ($n_D=1.45$), vinyl ethyl ether ($n_D=1.454$) and vinyl butyl ether ($n_D=1.456$) $\alpha,\beta$-unsaturated carboxylic acid esters such as butyl acrylate ($n_D=1.46$), ethyl acrylate ($n_D=1.47$), 2-ethoxyethyl acrylate ($n_D=1.471$), isopropyl methacrylate ($n_D=1.473$), n-butyl methacrylate ($n_D=1.483$), n-hexyl methacrylate ($n_D=1.4813$) and methyl methacrylate ($n_D=1.49$), and $\alpha\beta$-unsaturated compounds such as vinyl acetate ($n_D=1.4665$) and vinyl propionate ($n_D=1.4665$).

As a reactivity-imparting modifier or additive component, there can be used $\alpha,\beta$-unsaturated carboxylic acids, such as itaconic acid, acrylic acid, methacrylic acid, fumaric acid and maleic acid, $\alpha,\beta$-unsaturated carboxylic acid amides, such as acrylamide, methacrylamide, maleic acid amide and maleic acid imide, unsaturated carboxylic acid substituted amides, such as methylol acrylamide, methyl methacrylamide, methoxymethyl acrylamide and N-isobutoxymethyl acrylamide, heterocyclic vinyl compounds, such as vinylpyridine and vinylpyrrolidone, allyl compounds, such as allyl alcohol and allyl acetate, and glycidyl methacrylate. These monomers can be used singly or in the form of a mixture of two or more of them.

As the polymerization catalyst that is used for radical emulsion polymerization of the above-mentioned monomer having a polymerizable unsaturated bond, in the presence of the polyurethane emulsion, there are preferably employed peroxides, such as potassium persulfate, ammonium persulfate, hydrogen peroxide, benzoyl peroxide, t-butyl hydroperoxide, succinic acid hydroperoxide, cumene hydroperoxide, p-menthane hydroperoxide, di-tert-butyl peroxide and tert-butyl perbenzoate, and azobis type initiators, such as 2,2′-azobis(2-amidinopropane) hydrochloride and azobiscyclohexane carbonitrile. If necessary, these catalysts can be used in combination with promotors or activators, for example, water-soluble amines, such as ethylene diamine, diethylene triamine, triethylene tetramine, tetraethylene pentamine, pentaethylene hexamine, monoethanol amine, diethanol amine, triethanol amine, propylene diamine, diethyl amine and monoethyl amine, and pyrosulfurous acid, sodium bisulfate and sodium formaldehyde sulfoxylate. Furthermore, an organic halide, a nitro compound, an alkylmercaptan or diisopropyl xanthate can be used as a polymerization adjusting agent.

In the present invention the emulsion polymerization can be carried out, in the presence of the polyurethane emulsion, by appropriately combining the above-mentioned polymerizable polymer, catalyst, catalyst promotor and polymerization adjusting agent, according to known procedures.

The mixing ratio of the polyurethane (calculated as the solids) and polymerizable monomer is not particularly critical, but it is preferred that the polymerizable monomer is used in an amount of 99.5 to 2% by weight, especially 98 to 50% by weight, and the polyurethane is used correspondingly in an amount of 0.5 to 98% by weight, especially 2 to 50% by weight.

Since the polyurethane that is used for the emulsion polymerization acts as a surface active agent, a protective colloid or surface active agent need not be used in the emulsion polymerization, but in order to improve the stability of the formed resin emulsion or latex, a known protective colloid or surface active agent can be used provided that it does not exert a bad influence on the physical properties of the formed resin.

The polyurethane resin contained in the polyurethane emulsion that is used in the present invention is a linear polymer having a molecular weight of from 1,000 to 100,000 and which is soluble in tetrahydrofuran or dimethyl formamide. It is different from a gelatinous polyurethane because it is stably dissolved or dispersed in water and is formed into a homogeneous film by drying at ambient temperature or at an elevated temperature. Furthermore, because the polyurethane resin contains so-called thermosetting reactive groups capable of forming a crosslinked structure under heating, by the radical polymerization of a monomer having a polymerizable unsaturated bond, in the presence of the polyurethane emulsion, there can be obtained a homogeneous and stable resin emulsion or latex in which unreacted monomer does not remain at all. If this emulsion or latex is formed into a film and subjected to a heat treatment, curing of the resin is advanced and a cured resin having excellent physical properties can be obtained.

When hydroxyethyl acrylate, glycidyl methacrylate, 3-chloro-2-hydroxypropyl methacrylate, N-methylol acrylamide or the like is used as the monomer having a polymerizable unsaturated bond or as one component of a mixture of such monomers, a crosslinked structure having excellent physical properties can be formed by crosslinking groups contained in such monomer as well as the thermosetting reactive groups contained in the formed resin emulsion or latex. When a resin emulsion or latex is prepared by using the polyurethane in an amount smaller than 10% by weight, especially smaller than 5% by weight, based on the monomer having a polymerizable unsaturated bond, the polyurethane acts as an emulsifier and modifier. Because the polyurethane having a thermosetting reactivity is used an an emulsifier, the resin obtained from the resulting resin emulsion or latex is free of defects due to the use of an emulsifier which is conventionally hydrophilic, such as poor water resistance and insufficient luster. Also a polymerization retarding effect, which is frequently observed in the radical emulsion polymerization, does not occur at all using the above-mentioned polymeric emulsifier. Moreover, because an emulsion polymer is obtained at a high concentration, the economic advantages are great, and the quantity of precipitate formed during the emulsion polymerization is remarkably reduced. Still further, the formed resin emulsion or latex particles are very fine and the emulsion or latex is homogeneous and very stable.

As the silicon compound that is used in the present invention, there can be mentioned polysiloxanes, silane coupling agents and silica.

As the polysiloxane, there can be used dimethylpolysiloxane, methylhydrodiene-polysiloxane, methylphenylpolysiloxane, epoxy-modified polysiloxanes, alkyl-modified polysiloxanes, amino-modified polysiloxanes, carboxyl-modified polysiloxanes, alcohol-modified polysiloxanes, fluorine-modified polysiloxanes, polyether-modified polysiloxanes, epoxypolyether-modified polysiloxanes, alkylaralkylpolyether-modified polysiloxanes, and mixtures and copolymers thereof. These polysiloxanes are commercially available in the form of aqueous polysiloxane resin compositions, and such commercial products can be used as is.

The term "silane coupling agent" means an organic silicon-containing monomer having a reactive group capable of forming a chemical bond with an inorganic material, such as a methoxy, ethoxy or silanol group, and a reactive group capable of forming a chemical bond with an organic material, such as a vinyl, epoxy, methacryl, amino or mercapto group. For example, there can be used vinyltrichlorosilane, vinyltriethoxysilane, vinyltris-($\beta$-methoxyethoxy)silane, $\gamma$-glycidoxypropyltrimethoxysilane, $\gamma$-methacryloxypropyltrimethoxysilane, N-$\beta$-(aminoethyl)-$\gamma$-aminopropyltrimethoxysilane, N-$\beta$-(aminoethyl)-$\gamma$-aminopropylmethyldimethoxysilane, $\gamma$-chloropropyltrimethoxysilane, $\gamma$-mercaptopropyltrimethoxysilane, $\gamma$-aminopropyltriethoxysilane and carbamylaminopropyltrimethoxysilane. These monomers can be used singly or in the form of a mixture of two or more of them.

Liquid colloidal silica and powdery silica can be used in the present invention. Colloidal silica is preferred because it is easier to handle. The colloidal silica can contain a conventional emulsifier and a vinyl acetate emulsion incorporated for preventing gelation. The powdery silica can be either a single substance of silicon dioxide or a mixture of silicon dioxide and aluminum oxide.

Furthermore, the silicon compound may have a siloxane linkage alone or may have a siloxane linkage and a silanol group. The latter type is preferred because it is easier to handle.

In addition to the foregoing silicon compounds, there can be used silylating agents, for example, chlorosilanes, such as trimethylchlorosilane, dimethyldichlorosilane, vinyldimethylchlorosilane, trichlorosilane and vinyltrichlorosilane, ester silanes such as trimethylmethoxysilane, dimethyldimethoxysilane and dimethyldiethoxysilane, silazanes such as hexamethyldisilazane, and siloxanes such as hexamethyldisiloxane, octamethylcyclotetrasiloxane and $\alpha,\omega$-dihydroxypolydimethylsiloxane. Furthermore, there can be used polysiloxane water-repelling agents and polysiloxane block copolymers formed by adding ethylene oxide and/or propylene oxide to various polysiloxanes.

As the fluorine compound, there can be used a fluorine resin and a fluorine-type surface active agent. As the fluorine resin, there can be mentioned, for example, a polymer having a long-chain fluorocarbon on the side chain, polytetrafluoroethylene, polyvinyl fluoride, polyvinylidene fluoride, a hexafluoropropylenetetrafluoroethylene copolymer, a chlorotrifluoroethylenevinylidene chloride copolymer, and mixtures thereof.

These fluorine resins are commercially available in the form of aqueous emulsions containing a polymer dispersed in water. These commercially available products can be used, as is.

The term "fluorine type surface active agent" means a surface active agent containing a perfluoroalkyl group. For example, there can be used perfluoroalkylsulfonic acid salts, perfluoroalkylcarboxylic acid salts, perfluoroalkylethylene oxide adducts, perfluoroalkyltrimethyl ammonium salts, perfluoroalkylphosphoric acid esters, oligomers containing a perfluoroalkyl group and a hydrophilic group, oligomers containing a perfluoroalkyl group and an oleophilic group, oligomers containing a perfluoroalkyl group, a hydrophilic group and an oleophilic group, and urethanes containing a perfluoroalkyl group and an oleophilic group. These surface active agents can be used singly or in the form of a mixture of two or more of them.

As pointed out hereinbefore, an effect of deepening the color of fibers can be attained by forming a layer having a low refractive index on the surfaces of fibers. Accordingly, by subjecting dyed fibers, at ambient temperatures, to a dipping or padding treatment in an aqueous bath containing an aqueous resin composition obtained by polymerizing a monomer having a polymerizable unsaturated bond, in the presence of a polyurethane emulsion having a thermal reactivity, which resin composition is capable of providing a dry film having a refractive index lower than 1.50, that is, an aqueous solution of the color deepening agent (a) according to the present invention, a resin having a low refractive index is uniformly adsorbed on the surface of the fibers. By drying and heating the thus-treated fibers, the adsorbed resin is fixed to the surfaces of the fibers and good deepness and sharpness can be imparted to the color of the dyed fibers. Furthermore, if dyed fibers are treated in like fashion with the color deepening agent according to the present invention, which comprises (a) said aqueous resin composition and (b) a silicon compound and/or fluorine compound, which also has a low refractive index, enhanced deepness and sharpness can be imparted to the color of the dyed fibers. Although a silicon compound or fluorine compound can impart deepness and sharpness to the color of dyed fibers, when such a silicon compound or fluorine compound or a mixture thereof is used by itself, i.e. without the polymer, the attained deepness and sharpness are inferior to the deepness and sharpness of the color of dyed fibers treated with the color deepening agent of the present invention. Moreover, dyed fibers treated with an aqueous composition comprising a polysiloxane as the silicon compound are defective in that the touch is excessively slimy, the slip is large and the treated fibers are inferior in the sewability. Furthermore, dyed fibers treated with a fluorine type water-repelling agent are defective in that the touch is too hard. Still further, when dyed fibers treated with a silicon compound or fluorine compound alone are subjected to dry cleaning, the resin film formed on the surfaces of the fibers is dissolved by a dry cleaning solvent such as tetrachloroethylene or mineral spirit, and the durability of the color deepening effect is poor.

The reasons why excellent synergistic effects can be attained by the combination of the two ingredients of the color deepening agent, according to the present invention, has not been completely elucidated. It is, however, believed that the changes of the structure or molecular arrangement of the resin film formed on the surfaces of the fibers have advantageous influences on the maintenance of the low refractive index and that when the aqueous resin compostion is formed of a substance having a high glass transition temperature, the resin film is cracked and rendered convex and concave, whereby incident rays are absorbed on the resin film or the interior of fibers to reduce diffused reflection, and the covering effect of a low refractive index substance, such as a silicon compound or a fluorine compound, is added to such effect of the resin, whereby the color deepening effect is synergistically enhanced. It also is believed that even if the aqueous resin composition is formed of a substance having a low glass transition temperature and the resin film is not cracked or rendered convex or concave, changes of the structure or molcular arrangement of the resin film formed on the surfaces of the fibers make great contributions to enhancement of the color deepening effect.

In the present invention, the mixing ratio (a)/(b) of (a) the aqueous resin composition capable of providing a dry film having a refractive index lower than 1.5, which is obtained by polymerizing a monomer having a polymerizable unsaturated bond, in the presence of a polyurethane emulsion having a thermal reactivity, to (b) at least one compound selected from the group consisting of silicon compounds and fluorine compounds, is in the range of from 99.5/0.5 to 5/95, preferably from 98/2 to 10/90, especially preferably from 95/5 to 20/80, when the component (b) is a silicone compound, other than a silane coupling agent and silica, and/or fluorine compound, other than a fluorine type surface active agent. The mixing ratio (a)/(b) is in the range of from 99.9/0.1 to 20/80, preferably from 99.5/0.5 to 30/70, especially preferably from 99/1 to 50/50, if the component (b) is a silane coupling agent, silica and/or a fluorine type surface active agent.

The color deepening agent according to the present invention exerts a very excellent color deepening effect by virtue of the combined use of both of the components (a) and (b) and it also imparts an excellent touch to dyed fibers. Especially excellent results can be obtained when a polysiloxane and a fluorine compound or a silane coupling agent are used in combination as the component (b).

The color deepening agent according to the present invention can be prepared (I) by blending a silicon compound and/or a fluorine compound after the aqueous resin composition has been prepared or (II) by charging a silicon compound and/or a fluorine compound to the polymerization system when the aqueous resin composition is prepared by polymerizing a monomer having a polymerizable unsaturated bond, in the presence of a polyurethane emulsion having a thermal reactivity, provided that the polymerization is not inhibited by the addition of the silicon compound and/or fluorine compound, whereby a blend or copolymer is formed.

The ionic property of the component (b) is appropriately selected so that a complex is not formed. That is, a cationic, anionic or nonionic component (b) is appropriately chosen.

When the color deepening agent of the present invention is used, by subjecting dyed fibers to only a dipping or padding treatment with an aqueous solution of the color deepening agent, the resin can uniformly be adsorbed on the fiber surfaces and, by heating and drying the treated fibers, the resin is fixed to the fibers to deepen and sharpen the color of the dyed fibers, while maintaining excellent touch and dye fastness of the fibers.

The color deepening agent of the present invention can be applied to dyed fibrous products made not only of polyester fibers, but also made of fibers of cation-dyeable polyesters, polyamides, acrylic polymers, triacetates, rayons, wool, silk and cotton. In each case, high color deepening and sharpening effects can be obtained.

When the color deepening agent of the present invention is applied to fibers which are negatively charged in water (such as polyester fibers, cation-dyeable polyester fibers, triacetate fibers, diacetate fibers, Vinylon fibers, rayon fibers and cotton fibers), it is preferred that a cationic color deepening agent be used, although an anionic color deepening agent gives a sufficient effect. When the color deepening agent is applied to fibers which are positively charged in water (such as nylon fibers, polyamide fibers, wool fibers and silk fibers), it is preferred that an anionic color deepening agent be used, although a sufficient effect can be obtained by a cationic color deepening agent.

The color deepening agent of the present invention can be subjected to an adsorption treatment under conventional conditions after the dyeing operation. When the ionic characteristic of the color deepening agent is the same as that of the dye used, the color deepening agent can be used at the dyeing step together with the dye. Moreover, the adsorption treatment with the color deepening agent of the present invention can be carried out before the dyeing operation.

The present invention will now be further described in detail with reference to the following illustrative Referential Examples and Examples that by no means limit the scope of the present invention. In the Referential Examples and Examples, references to "parts" and "%" are by weight unless otherwise indicated.

REFERENTIAL EXAMPLE 1

A propylene oxide adduct of bisphenol A (having a hydroxyl value of 315) was dehydrated under reduced pressure at 100° C., and 115 parts of the dehydration product were charged into a round-bottom flask equipped with a thermometer and a stirrer and 87.5 parts of methylethyl ketone and 112.5 parts of an 80/20 mixture of 2,4-tolylene diisocyanate and 2,6-tolylene diisocyanate were added. Reaction was carried out at 70° C. for 4 hours to obtain a solution of a urethane prepolymer containing 8.36% of free isocyanate groups.

In a different flask, 487.4 parts of methylethyl ketone was mixed with 39.1 parts of diethylene triamine at 30° to 40° C. for 1 hour, and 320 parts of the above urethane prepolymer solution were gradually added dropwise to the resulting solution over a period of 40 minutes with stirring. Then, 162.5 parts of methylethyl ketone were added to dilute the mixture and reaction was carried out at 50° C. for 30 minutes. At the end of that time, in an infrared absorption spectrum of the reaction mixture, an absorption due to the presence of free isocyanate groups at 2250 cm$^{-1}$ was not observed at all.

The thus-obtained reaction mixture was mixed with 101.4 parts of water and 18.3 parts of epichlorohydrin, and reaction was carried out at 50° C. for 1 hour. Then, 42.8 parts of a 70% aqueous solution of glycolic acid and 707 parts of water were added to the reaction mixture, and methylethyl ketone was removed by distillation under reduced pressure at about 40° C. Water was added to the residue to adjust the concentration, whereby a homogeneous and stable polyurethane emulsion having a resin content of 30% was obtained.

A resin obtained by drying this emulsion resembled a hard plastic.

REFERENTIAL EXAMPLE 2

A round-bottom flask equipped with a stirrer and a thermometer was charged with 353 parts of a propylene oxide adduct of bisphenol A (having a hydroxyl value of 316.9), 300 parts of methylethyl ketone and 347 parts of an 80/20 mixture of 2,4-tolylene diisocyanate and 2,6-tolylene diisocyanate, and reaction was carried out at 75° C. for 3 hours to obtain a solution of a urethane prepolymer containing 8.63% of free isocyanate groups.

In a different flask, 1990 parts of methylethyl ketone were homogeneously mixed with 123 parts of diethylene triamine, and 988 parts of the above-mentioned urethane prepolymer solution were gradually added to the mixture through a dropping funnel over a period of 1.5 hours and reaction was carried out at 50° C. for 30 minutes to obtain a polyurethane urea polyamine solution. When an infrared absorption spectrum was obtained by using a part of the solution, an absorption due to free isocyanate groups at 2250 cm$^{-1}$ was not observed.

A different flask was charged with 500 parts of the polyurethane urea polyamine solution, and 30 parts of deionized water were added and homogeneously mixed with the solution. Then, 22.4 parts of epichlorohydrin were added to the mixture and reaction was carried out at 50° C. for 1 hour. Then, a solution of 28.5 parts of maleic anhydride in 100 parts of methylethyl ketone was added to the reaction mixture and reaction was carried out at 50° C. for 30 minutes. Then, a solution of 12.6 parts of sodium hydroxide in 446 parts of deionized water was added to the reaction mixture and the organic solvent was removed by distillation under reduced pressure at 30° to 40° C. Water was added to the residue to adjust the concentration and obtain a homogeneous, stable, and low viscosity polyurethane emulsion having a resin content of 30%.

REFERENTIAL EXAMPLE 3

A solution of 245.2 parts of a polyester glycol (having a hydroxyl value of 54.9) obtained by dehydrating condensation of an equimolar mixture of ethylene glycol and 1,4-butane diol with adipic acid, in 123 parts of benzene, was charged in a flask equipped with a thermometer and a stirrer, and 41.8 parts of an 80/20 mixture of 2,4-tolylene diisocyanate and 2,6-tolylene diisocyanate were added to the above solution and reaction was carried out at 70° C. for 2 hours to obtain a solution of a urethane prepolymer containing 2.36% of free isocyanate group.

In a different flask, 360 parts of methylethyl ketone were sufficiently mixed with 6.1 parts of diethylene triamine, and 180 parts of the above urethane prepolymer solution were added dropwise to the resulting solution with stirring over a period of 20 minutes and reaction was carried out at 50° C. for 30 minutes.

Then, 7.0 parts of epichlorohydrin were added to the reaction mixture and reaction was carried out at 50° C. for 1 hour. Then, 8.0 parts of a 70% aqueous solution of glycolic acid and 554 parts of deionized water were added to the reaction mixture, and benzene and methylethyl ketone were removed by distillation under reduced pressure and water was added to the residue to adjust the concentration and obtain a homogeneous, stable and low viscosity polyurethane emulsion having a resin content of 20%.

The emulsion was cast and air-dried on a Teflon sheet having a smooth surface to obtain a uniform, transparent and soft rubber (air-dried film). The air-dried film was heat-treated at 120° C. for 20 minutes to obtain a heat-treated film.

The mechanical properties of these films were as follows.

|                              | Air-Dried Film | Heat-Treated Film |
| ---------------------------- | -------------- | ----------------- |
| 100% Modulus (Kg/cm$^2$)     | 7              | 8                 |
| Tensile Strength (Kg/cm$^2$) | 8              | 78                |
| Tensile Elongation (%)       | 2100           | 820               |

REFERENTIAL EXAMPLE 4

A round-bottom flask equipped with a thermometer and a stirrer was charged with 294.9 parts of a polyester glycol (having a hydroxyl value of 103.0) synthesized by dehydrating condensation of ethylene glycol and adipic acid, 292.6 parts of a propylene oxide of bisphenol A (having a hydroxyl value of 311.7 parts) and 364.3 parts of benzene and they were mixed to form a homogeneous mixture. Then 262.5 parts of an 80/20 mixture of 2,4-tolylene diisocyanate and 2,6-tolylene diisocyanate were added to the mixture and reaction was carried out at 80° C. for 10 hours to obtain a solution of a urethane prepolymer containing 3.04% of free isocyanate groups.

In a different round-bottom flask, 2324 parts of methylethyl ketone were homogeneously mixed with 51 parts of diethylene triamine, and 1162 parts of the above urethane prepolymer solution were added dropwise to the mixture with stirring over a period of 1 hour and reaction was carried out at 50° C. for 30 minutes. Then, 59.5 parts of epichlorohydrin were added to the reaction mixture and reaction was carried out at 50° C. for 1 hour. Then, a solution of 75.6 parts of maleic anhydride in 200 parts of methylethyl ketone was added to the reaction mixture, and reaction was carried out at 50° C. for 30 minutes. Then, a solution of 36.0 parts of sodium hydroxide in 1750 parts of water was added to the reaction mixture and the organic solvent was removed by distillation under reduced pressure at 40° C. to obtain a uniform and stable emulsion having a resin content of 37%. Water was added to the emulsion to adjust the resin content to 30%.

A film (air-dried film) obtained by casting the emulsion of a Teflon sheet having a smooth surface and drying the cast emulsion at room temperature was hard and strong and resembled a rigid plastic. A film (heat-treated film) obtained by heat-treating the air-dried film at 120° C. for 20 minutes was very hard and resembled a tough plastic.

REFERENTIAL EXAMPLE 5

A urethane prepolymer solution containing 2.64% of free isocyanate groups was obtained from 383.1 parts of dehydrated polyoxytetramethylene glycol (having a hydroxyl value of 58.3), 192.9 parts of benzene and 66.9 parts of 1,6-hexamethylene diisocyanate according to the method described in Referential Example 1.

In a different flask, 640 parts of acetone were homogeneously mixed with 12 parts of diethylene triamine, and 633 parts of the above urethane prepolymer solution were added dropwise to the resulting solution in the same manner as described in Referential Example 1 to obtain a polyurethane urea polyamine solution. Then, 97 parts of water and 14.1 parts of epichlorohydrin were added to the solution and reaction was carried out at 50° C. for 1 hour. Then, 16.5 parts of a 70% aqueous solution of glycolic acid and 1004 parts of water were added to the reaction mixture, and the solvent was removed by distillation and the concentration was adjusted in the same manner as described in Referential Example 1 to obtain a homogeneous polyurethane emulsion having a resin content of 20%.

REFERENTIAL EXAMPLE 6

A urethane prepolymer solution containing 2.74% of free isocyanate groups was obtained from 252.8 parts of dehydrated and dried polyoxytetramethylene ether glycol, 127.9 parts of methylethyl ketone and 45.7 parts of an 80/20 mixture of 2,4-tolylene diisocyanate and 2,6-tolylene diisocyanate according to the method described in Referential Example 2.

A different reaction vessel was charged with 16.9 parts of diethylene triamine and 639.6 parts of methylethyl ketone, and 420 parts of the above urethane prepolymer solution were gradually added dropwise to the mixture over a period of 30 minutes and reaction was carried out at 50° C. for 30 minutes. Then, 19.7 parts of epichlorohydrin were added to the reaction mixture and reaction was carried out at 50° C. for 1 hour. Then, a solution of 25 parts of maleic anhydride in 250 parts of methylethyl ketone was added to the reaction mixture and reaction was carried out at 50° C. for 30 minutes. Then, a solution of 11.9 parts of sodium hydroxide in 2230 parts of water was homogeneously mixed with the reaction mixture, and the solvent was removed by distillation under reduced pressure to obtain a homogeneous polyurethane emulsion having a resin content of 15%.

REFERENTIAL EXAMPLE 7

(A) A solution of 103.0 parts (1 mole) of diethylene triamine in 103 parts of methylethyl ketone was charged in a round-bottom flask equipped with a thermometer and a stirrer and stirred at 25° to 30° C. for 30 minutes, and a solution of 46.3 parts (0.5 mole) of epichlorohydrin in 46.3 parts of methylethyl ketone was added dropwise to the above solution at 30° to 45° C. over a period of 15 minutes and reaction was carried out at 45° C. for 1.5 hours. The reaction mixture did not contain epoxide groups but contained chlorine of the covalent bond.

(B) In a different round-bottom flask, 9.9 parts of the above reaction mixture (methylethyl ketone solution having a concentration of 50%) were homogeneously mixed with 200 parts of methylethyl ketone, and 100 parts of a urethane prepolymer solution prepared according to the same method as described in Referential Example 1 were gradually added dropwise to the mixture to effect reaction. Then, 4.4 parts of a 70% aqueous solution of glycolic acid and 296 parts of water were added to 293 parts of the resulting polymer solution, and methylethyl ketone was removed by distillation under reduced pressure and the concentration was adjusted by addition of water to obtain a homogeneous and stable polyurethane emulsion having a resin content of 20%.

SYNTHESIS EXAMPLE 1

A 4-neck flask having a capacity of 500 ml and which was equipped with a nitrogen introducing pipe and a dropping funnel was charged with 16.7 parts of the cationic polyurethane emulsion obtained in Referential Example 1 (5 parts calculated as the solids) and 233 parts of deionized water, and the internal atmosphere was replaced with nitrogen, with stirring. Then, 10 parts of heptafluorobutyl acrylate was added to the mixture and the temperature was elevated to 60° C., and 0.105 part of 2,2'-azobis(2-amidinopropane)hydrochloride was added to the mixture and then 90 parts of heptafluorobutyl acrylate was added dropwise to the mixture over a period of 1 hour through the dropping funnel. The mixture was aged at 60° C. for 1 hour and then the mixture was cooled to room temperature and passed through a 100-mesh metal net to remove a polymer precipitate formed by polymerization, whereby a stable emulsion free of a monomer smell was obtained. The amount of the polymer precipitate formed during the polymerization was 3.5% based on the charged monomer (hereinafter referred to as "polymerization stability").

The average particle size of the obtained emulsion was $0.1\mu$ (as determined according to the simple opacity method; the same will apply hereinafter), the viscosity was 97 cp (as determined according to a method using a Brookfield viscometer; the same will apply hereinafter), the pH value was 3.6 (as determined with respect to a 5% aqueous solution of the emulsion; the same will apply hereinafter) and the mechanical stability was 0.07% (the amount of the precipitate obtained by stirring the emulsion in a tall beaker at 4000 rpm/5 min. by a laboratory mixer, which was expressed as % based on the solids; the mechanical stability mentioned hereinafter was the value determined according to this method unless otherwise indicated). Thus, the obtained emulsion was a very stable cationic emulsion. The polymerization ratio was 100%.

SYNTHESIS EXAMPLE 2

A 500-ml capacity 4-neck flask equipped with a nitrogen introducing pipe and a dropping funnel was charged with 5.0 parts of the cationic polyurethane emulsion obtained in Referential Example 3 (1 part as the solids) and 232 parts of deionized water, and the internal atmosphere was replaced by nitrogen. Then, 10 parts of butyl acrylate was added and the temperature was elevated to 60° C. with stirring, and 0.105 part of 2,2'-azobis(2-amidinopropane)hydrochloride was added and then 90 parts of butyl acrylate were added dropwise over a period of 1 hour. Then, the mixture was aged at 60° C. for 1 hour, and the reaction mixture was treated in the same manner as described in Example 1 to obtain an emulsion free of a monomer smell.

The polymerization stability was 3.6%, the polymerization ratio was 100%, the mechanical stability of the emulsion was 3.1%, the average particle size was $0.15\mu$, the viscosity was 500 cp, and the pH value was 4.5.

SYNTHESIS EXAMPLE 3

A 300-ml capacity 4-neck flask equipped with a nitrogen introducing pipe and a dropping funnel was charged with 48.8 parts of the cationic polyurethane emulsion obtained in Referential Example 1 (9.75 parts as the solids) and 26.2 parts of deionized water, and the temperature was elevated to 45° C. while the internal atmosphere was replaced by nitrogen. Then, 5 parts of isobutyl methacrylate, 0.105 part of p-menthane hydroperoxide and 5 parts of a 1% aqueous solution of sodium formaldehyde sulfoxylate were added, in that order, to start polymerization. Then, 15 parts of isobutyl methacrylate were added dropwise to the reaction mixture over a period of 30 minutes and the mixture was aged at 50° C. for 2 hours to complete the polymerization.

The post treatment was carried out in the same manner as described in Synthesis Example 1. A precipitate was not formed during the polymerization, and a stable latex having a fine particle size (less than $0.5\mu$) and a low viscosity (9.1 cp) was obtained. The polymerization ratio was 100%. When this latex was heated at 120° C. for 20 minutes, there was obtained a lustrous hard plastic.

SYNTHESIS EXAMPLE 4

A 300-ml capacity 4-neck flask was charged with 50 parts of the cationic polyurethane emulsion obtained in Referential Example 7 (10 parts as the solids) and 30 parts of water, and the temperature was elevated to 60° C. while the internal atmosphere was replaced by nitrogen. Then, 5 parts of monomeric vinyl acetate were added and 0.15 part of 2,2'-azobis(2-amidinopropane)hydrochloride was added to start polymerization. Then, 15 parts of monomeric vinyl acetate were added dropwise to the reaction mixture over a period of 30 minutes and the reaction mixture was aged at 60° C. for 1 hour to complete polymerization. Precipitation of the polymer was not observed during the polymerization, and a stable emulsion was obtained.

The emulsion had an average particle size of $0.1\mu$ and a viscosity of 9.5 cp. The polymerization ratio was 100%.

SYNTHESIS EXAMPLE 5

Emulsion polymerization was carried out by using 37.5 parts of the cationic polyurethane emulsion obtained in Referential Example 5 (7.5 parts as the solids), 96 parts of n-butyl methacrylate, 3 parts of N-methylolacrylamide and 1 part of itaconic acid, which were added by the sequential dropping method, and also by using 0.15 part of 2,2'-azobis(2-amidinopropane)hydrochloride and 220 parts of deionized water in the same manner as described in Synthesis Example 1.

An emulsion having a polymerization stability of 1.5%, a mechanical stability of 5.2%, an average particle size of $0.2\mu$, a viscosity of 64 cp and a pH value of 4.3 was obtained. The polymerization ratio was 100%.

SYNTHESIS EXAMPLE 6

A 500-ml capacity 4-neck flask equipped with a nitrogen introducing pipe and a dropping funnel was charged with 16.7 parts of the anionic polyurethane emulsion obtained in Referential Example 2 (5 parts as the solids), and 233 parts of deionized water were added and the pH value was adjusted to 10 by addition of sodium carbonate. Then, the internal atmosphere was replaced by nitrogen, and 10 parts of trifluoroisopropyl methacrylate were added and the temperature was elevated to 60° C. Then, 0.15 part of 2,2'-azobis(2-amidinopropane)hydrochloride was added to start polymerization, and then 90 parts of trifluoroisopropyl methacrylate were added dropwise to the reaction mixture over a period of 1 hour and the reaction mixture was aged at 60° C. for 1 hour. Then, the reaction mixture was cooled to room temperature and passed through a 100-mesh metal net to remove the precipitate that formed during the polymerization and to recover a stable emulsion free of an unreacted monomer smell. The amount of the precipitate that formed during the polymerization was 3.5%, based on the charged monomer. The obtained emulsion was very stable and had an average particle size of $0.16\mu$, a viscosity of 27.5 cp, a pH value of 8.0 and a mechanical stability of 0.4%. The polymerization ratio was 100%.

The emulsion was cast and air-dried on a Teflon sheet having a smooth surface, and a uniform, transparent and soft rubber (air-dried film) was obtained. When this air-dried film was heat-treated at 120° C. for 20 minutes, there was obtained a heat-treated film which was uniform, transparent and lustrous and was formed of a rubber elastomer having no stickiness.

When these films were dipped in water at 30° C. for 24 hours, the swelling ratios (weight increase ratios) were as follows.

|  | Air-Dried Film | Heat-Treated Film |
|---|---|---|
| Swelling Ratio (Weight Increase Ratio) | 1.9% | 0.5% |

SYNTHESIS EXAMPLE 7

Emulsion polymerization of methyl acrylate in the anionic polyurethane emulsion prepared in Referential Example 4 was carried out using the same recipe and conditions as employed in Synthesis Example 6, except that 0.1 part of potassium persulfate and 0.05 part of sodium bisulfite were used as the polymerization initiators, the monomer dropping time was changed to 2 hours, and the aging time was changed to 2 hours.

A very stable emulsion having a polymerization stability of 4.5%, a mechanical stability of 0.2%, an average particle size of $0.16\mu$, a viscosity of 13.5 cp and a pH value of 8.2 was obtained. The polymerization ratio was 99.8%.

SYNTHESIS EXAMPLE 8

A 500-ml capacity 4-neck flask equipped with a dropping funnel and a nitrogen introducing pipe was charged with 33.3 parts of the anionic polyurethane emulsion obtained in Referential Example 2 (10 parts as the solids) and 233 parts of deionized water, and the pH value was adjusted to 10 by addition of sodium carbonate.

The internal atmosphere was replaced by nitrogen and the temperature was elevated to 60° C., and 10 parts of monomeric butyl acrylate, 0.2 part of potassium peroxide and 0.1 part of sodium bisulfite were added in that order, with stirring to start polymerization. Then, 90 parts of monomeric methyl methacrylate were added dropwise to the reaction mixture at 65° C., with stirring, over a period of 1.5 hours. Then, the reaction mixture was aged at 65° C. for 1 hour and cooled to room temperature.

The polymer that precipitated during the polymerization was removed from the resulting emulsion by filtration using a 100-mesh metal net, and a homogeneous and stable emulsion free of monomer smell was obtained. The polymerization ratio was 100%.

The emulsion had a polymerization stability of 1.2%, a mechanical stability of 1.5%, an average particle size of $0.08\mu$, a viscosity of 20 cp and a pH value of 8.0.

SYNTHESIS EXAMPLE 9

A 300-ml capacity 4-neck flask equipped with a dropping funnel and a nitrogen introducing pipe was charged with 33.3 parts of the anionic polyurethane emulsion obtained in Referential Example 6 (10 parts as the solids) and 45 parts of deionized water, and the internal atmosphere was replaced by nitrogen and the temperature was elevated to 45° C. Then, 5 parts of n-hexyl methacrylate, 0.25 part of glycidyl methacrylate, 0.105 part of p-menthane hydroperoxide and 5 parts of a 1% aqueous solution of sodium formaldehyde sulfoxylate were added in that order, with stirring, to start polymerization. Then, 15 parts of n-hexyl methacrylate and 0.75 part of glycidyl methacrylate were added dropwise to the reaction mixture at 50° C. over a period of 30 minutes. Then, the reaction mixture was aged at 50° C. for 1 hour to complete the polymerization. Precipitation of the polymer was scarcely observed during polymerization.

A very stable emulsion having an average particle size less than $0.05\mu$ and a viscosity of 8.4 cp was obtained. The polymerization ratio was 99.9%.

A film obtained from the thus-prepared emulsion in the same manner as described in Synthesis Example 6 was uniform, transparent and excellent in surface luster.

SYNTHESIS EXAMPLE 10 (COMPARISON)

A 500-ml capacity separable 4-neck flask equipped with a nitrogen introducing pipe was charged with 5 parts of Emulgen 950 (polyoxyethylene nonylphenyl ether type nonionic surface active agent supplied by Kao Soap Co., Ltd.) and 235 parts of deionized water, and the mixture was stirred under a nitrogen gas current to form a homogeneous solution. Then, 0.1 part of potassium persulfate and 10 parts of butyl acrylate were added and the temperature was elevated to 50° C. Then, 10 parts of a 0.5% aqueous solution of sodium bisulfite were added and the temperature was elevated to 60° C., and 90 parts of butyl acrylate were added dropwise to the mixture, with stirring, over a period of 1 hour and the reaction mixture was aged at 60° C. for 1 hour to complete the polymerization.

Then, the precipitated polymer was removed by filtration using a 100-mesh stainless steel net. An emulsion having a solid content of 30.3%, an average particle size of $0.27\mu$, a viscosity of 46.7 cp (as measured at 25° C.) and a pH value of 4.2 (as measured with respect to a 5% dilution product) was obtained. The polymerization ratio was 99.3%.

SYNTHESIS EXAMPLE 11 (COMPARISON)

A 500-ml capacity separable 4-neck flask equipped with a nitrogen introducing pipe was charged with 5 parts of Emulgen 935 (polyoxyethylene nonylphenyl ether type nonionic surface active agent supplied by Kao Soap Co., Ltd.) and 235 parts of deionized water, and the mixture was stirred under a nitrogen gas current to form a homogeneous solution. Then, 0.1 part of potassium persulfate and 10 parts of isopropyl methacrylate were added and the temperature was elevated to 50° C., and 10 parts of a 0.5% aqueous solution of sodium bisulfite were added and the temperature was elevated to 60° C. Then, 90 parts of isopropyl methacrylate were added dropwise to the reaction mixture, with stirring, over a period of 1 hour, and the reaction mixture was then aged at 60° C. for 1 hour, to complete the polymerization.

The precipitate was removed by filtration using a 100-mesh stainless steel net. An emulsion having a solid content of 30.8%, an average particle size of $0.22\mu$, a viscosity of 18.8 cp (as measured at 25° C.) and a pH value of 4.6 (as determined with respect to a 5% dilution product) was obtained. The polymerization ratio was 99.5%.

PREPARATION EXAMPLE 1

The cationic aqueous resin composition (A) obtained in Synthesis Example 1 was blended with Polon MF-6 (B) (non-ionic aqueous polysiloxane resin composition having a solid content of 20%; supplied by Shinetsu Kagaku Kogyo Co., Ltd.) so that the (A)/(B) mixing weight ratio was 80/20, calculated as the solids.

PREPARATION EXAMPLE 2

Polymerization was carried out in the same manner as described in Synthesis Example 2, except that Polon MF-14C (B) (non-ionic aqueous amino-modified polysiloxane resin composiion having a solid content of 30%; supplied by Shinetsu Kagaku Kogyo Co., Ltd.) was used in combination with the butyl acrylate monomer. The solid weight ratio (A)/(B) of the sum (A) of the cationic urethane and butyl acrylate to MF-14C (B) was 90/10.

PREPARATION EXAMPLE 3

The cationic aqueous resin composition (A) obtained in Synthesis Example 2 was blended with Polon MF-14C (B) and Aerosil MOX 80 (C) (powdery silica having an $SiO_2$ content of 99%; supplied by Nihon Aerosil Co., Ltd.) so that the (A)/(B)/(C) solid weight ratio was 70/29/1.

PREPARATION EXAMPLE 4

The cationic aqueous resin composition (A) obtained in Synthesis Example 3 was blended with KBC (1003 (B) so that the (A)/(B) mixing solid weight ratio was 95/5.

PREPARATION EXAMPLE 5

The cationic aqueous resin composition (A) obtained in Synthesis Example 5 was blended with Polon MF-11 (B) (non-ionic aqueous epoxy-modified polysiloxane resin having a solid content of 30% supplied by Shinetsu Kagaku Kogyo Co., Ltd.) and KBC 1003 (C) so that the (A)/(B)/(C) mixing solid weight ratio was 50/45/5.

PREPARATION EXAMPLE 6

The anionic aqueous resin composition (A) obtained in Synthesis Example 6 was blended with SM 8710 (B), A-1160 (C) (carbamylaminopropyltrimethoxysilane having a solid content of 100%; supplied by Nihon Unicar Co., Ltd.) and Snotex O (D) (anionic aqueous colloidal silica supplied by Nissan Kagaku Co., Ltd.) so that the (A)/(B)/(C)/(D) mixing solid weight ratio was 40/50/3/7.

PREPARATION EXAMPLE 7

Polymerization was carried out in the same manner as described in Synthesis Example 7 except that Asahi Guard AG-710 was used in combination with the methyl acrylate monomer. The solid weight ratio (A)/(B) of the sum (A) of the anionic urethane and methyl acrylate to Asahi Guard AG-710 (B) was 75/25.

PREPARATION EXAMPLE 8

The anionic aqueous resin composition (A) obtained in Synthesis Example 7 was blended with SM 8710 (B) and Snotex O (C) so that the (A)/(B)/(C) solid weight ratio was 50/40/10.

PREPARATION EXAMPLE 9

The anionic aqueous resin composition (A) obtained in Synthesis Example 8 was blended with Megafac F-1420 (B) (non-ionic fluorine type surface active agent having a solid content of 100%; supplied by Dainihon Ink Kagaku Kogyo Co., Ltd.) so that the (A)/(B) solid weight ratio was 98/2.

PREPARATION EXAMPLE 10

The anionic aqueous resin composition (A) obtained in Synthesis Example 8 was blended with L-7607 (B) (non-ionic polysiloxane-ethylene oxide block copolymer supplied by Nihon Unicar Co., Ltd.) so that the (A)/(B) solid weight ratio was 85/15.

PREPARATION EXAMPLE 11

Polymerization was carried out in the same manner as described in Synthesis Example 9 except that KBM-503 (γ-methacryloxypropyltrimethoxysilane supplied by Shinetsu Kagaku Kogyo Co., Ltd.; solid content=100%) was used in combination with n-hexyl methacrylate and glycidyl methacrylate monomers. The (A)/(B) solid weight ratio of the sum (A) of the anionic urethane, n-hexyl methacrylate and glycidyl methacrylate to KBM-503 (B) was 97/3.

PREPARATION EXAMPLE 12

The anionic aqueous resin composition (A) obtained in Synthesis Example 9 was blended with Asahi Guard AG-710 (B) and Megafac F-1420 (C) so that the (A)/(B)/(C) solid weight ratio was 20/75/5.

PREPARATION EXAMPLE 13

The anionic aqueous resin composition (A) obtained in Synthesis Example 9 was mixed with SM 8710 (B) and Megafac F-1420 (C) so that the (A)/(B)/(C) solid weight ratio was 30/60/10.

PREPARATION EXAMPLE 14 (COMPARISON)

The non-ionic aqueous resin composition (A) of Synthesis Example 10 was blended with Polon MF-6 (B) so that the (A)/(B) solid weight ratio was 80/20.

PREPARATION EXAMPLE 15 (COMPARISON)

The non-ionic aqueous resin composition (A) of Synthesis Example 10 was blended with Asahi Guard AG-710 (B) so that the (A)/(B) solid weight ratio was 75/25.

PREPARATION EXAMPLE 16 (COMPARISON)

The non-ionic aqueous resin composition (A) of Synthesis Example 10 was blended with Polon MF-6 (B) and KBC 1003 (C) so that the (A)/(B)/(C) solid weight ratio was 70/27/3.

PREPARATION EXAMPLE 17 (COMPARISON)

The non-ionic aqueous resin composition (A) of Synthesis Example 11 was blended with Asahi Guard AG-710 (B) and Megafac F-1420 (C) so that the (A)/(B)/(C) solid weight ratio was 20/75/5.

PREPARATION EXAMPLE 18 (COMPARISON)

The non-ionic aqueous resin composition (A) of Synthesis Example 11 was blended with SM 8710 (B) and Megafac F-1420 (C) so that the (A)/(B)/(C) solid weight ratio was 30/60/10.

The foregoing Preparation Examples are summarized in Table 1.

TABLE 1

| Preparation Example No. | Aqueous Composition (A) Ionic Property | Kind | Ionic Property | Compound (B) | Compound (C) | Compound (D) | Ratio A/B/C/D | Preparation Method |
|---|---|---|---|---|---|---|---|---|
| 1 | cationic | Synthesis Example 1 | cationic | polysiloxane | | | 80/20 | blending |
| 2 | " | Example 2 | " | amino-modified polysiloxane | | | 90/10 | charging at polymerization |
| 3 | " | Example 2 | " | amino-modified polysiloxane | powdery silica | | 70/29/1 | blending |
| 4 | " | Example 3 | " | silane coupling agent | | | 95/5 | " |
| 5 | " | Example 5 | " | epoxy-modified polysiloxane | silane coupling agent | | 50/45/5 | " |
| 6 | anionic | Example 6 | anionic | OH—terminated polysiloxane | silane coupling agent | colloidal silica | 40/50/3/7 | " |
| 7 | " | Example 7 | " | fluorine resin | | | 75/25 | charging at polymerization |
| 8 | " | Example 7 | " | OH—terminated polysiloxane | colloidal silica | | 50/40/10 | blending |
| 9 | " | Example 8 | " | fluorine type surfactant | | | 98/2 | " |
| 10 | " | Example 8 | " | polysiloxane-ethylene oxide block copolymer | | | 85/15 | " |
| 11 | " | Example 9 | " | silane coupling agent | | | 97/3 | charging at polymerization |
| 12 | " | Synthesis Example 9 | " | fluorine resin | fluorine type surfactant | | 20/75/5 | blending |
| 13 | " | Example 9 | " | OH—terminated polysiloxane | fluorine type surfactant | | 30/60/10 | " |
| 14 | cationic | Example 10 | non-ionic | polysiloxane | | | 80/20 | " |
| 15 | non-ionic | Example 10 | " | fluorine resin | | | 75/25 | " |
| 16 | cationic | Example 10 | " | polysiloxane | silane coupling agent | | 70/27/3 | " |
| 17 | non-ionic | Example 11 | " | fluorine resin | fluorine type surfactant | | 20/75/5 | " |
| 18 | anionic | Example 11 | " | OH—terminated polysiloxane | fluorine type surfactant | | 30/60/10 | " |

EXAMPLE 1

Polyester, cation-dyeable polyester, acrylic polymer, triacetate, polyamide, wool, silk and cotton fibers were dyed as deeply as possible by using black dyes suitable for the respective fibers.

Then, the dyed fabrics were treated with the aqueous resin compositions shown in the foregoing Preparation Examples and the color deepening effects were examined. The obtained results are shown in Tables 2 and 3.

Treatment Conditions (1) Pad-Dry-Baking Method:

A bath containing 30 g/l of the color deepening agent listed in Table 2 or 3 was prepared and the fabric was padded in this bath at a temperature of from 30° C. to room temperature and squeezed at a squeeze ratio of 100%. The fabric was then dried at 100° C. for 3 minutes and baked at 160° C. for 3 minutes. In the case of fabrics made of polyamide fibers, however, baking was carried out at 110° C. for 3 minutes.

(2) Dipping-Squeezing-Drying-Fixing Method:

A bath containing 5 g/l of the color deepening agent listed in Table 2 or 3 was prepared, and the fabric was dipped with stirring in the bath at 30° C. for 10 minutes at a bath ratio of 1/10 to make the color deepening agent uniformly adsorbed in the fibers. Then, the fabric was subjected to centrifugal dehydration so that the squeeze ratio was 80% increase. Then, the fabric was dried at 100° C. and baked at 160° C. for 3 minutes.

Evaluation

The color deepening effect was measured by a digital color difference meter (supplied by Nippon Denshoku Kogyo Co., Ltd.). In the case of black fabrics, the luminosity coefficient value L alone was determined. In the case of other color fabrics, the luminosity coefficient values L, a and b were determined. A smaller value L indicates a lower lightness and a deeper color.

TABLE 2

| Color Deepening Agent (Resin) | | Fiber | | L Values | | |
|---|---|---|---|---|---|---|
| Ionic Property Products of Present Invention | Preparation Example No. | Material | Texture | untreated | dipping method | pad-dry-baking method |
| cationic | 1 | polyester | crepe weave | 14.8 | 12.9 | 12.8 |
| " | 2 | " | georgette | 13.8 | 12.0 | 12.1 |
| " | 3 | cation-dyeable polyester | double georgette | 14.0 | 12.0 | 12.1 |
| " | 4 | cation- | palace crepe | 13.9 | 12.0 | 12.0 |

TABLE 2-continued

| Color Deepening Agent (Resin) Ionic Property Products of Present Invention | Preparation Example No. | Fiber Material | Texture | L Values untreated | dipping method | pad-dry-baking method |
|---|---|---|---|---|---|---|
| " | 5 | dyeable polyester polyester/ wool = 80/20 | spun twill | 14.7 | 12.8 | 12.8 |
| " | 1 | acrylic | serge | 14.9 | 13.1 | 13.0 |
| " | 2 | " | tropical | 15.2 | 13.3 | 13.4 |
| " | 3 | triacetate | georgette | 13.4 | 11.5 | 11.6 |
| " | 4 | " | crepe de chine | 13.1 | 11.3 | 11.2 |
| " | 5 | cotton | gabardine | 14.8 | 12.9 | 13.0 |
| anionic | 6 | polyamide | palace crepe | 14.3 | 12.4 | 12.3 |
| " | 7 | " | taffeta | 14.8 | 12.7 | 12.7 |
| " | 8 | silk | crepe | 13.8 | 11.9 | 12.0 |
| " | 9 | " | palace crepe | 14.3 | 12.3 | 12.1 |
| " | 10 | wool | serge | 14.0 | 12.2 | 12.3 |
| " | 11 | " | cashmere doeskin | 14.7 | 13.0 | 12.8 |
| " | 12 | " | twill | 14.3 | 12.5 | 12.6 |
| " | 13 | wool/ acrylic = 80/20 | serge | 14.9 | 12.9 | 13.1 |

TABLE 3

| Color Deepening Agent (Resin) Ionic Property Comparative Products | Kind | Fiber Material | Texture | L Values untreated | dipping method | pad-dry-baking method |
|---|---|---|---|---|---|---|
| non-ionic | Synthesis Example 10 | polyester | crepe weave | 14.8 | 14.4 | 14.5 |
| " | Synthesis Example 11 | acrylic | serge | 14.9 | 14.7 | 14.8 |
| " | Preparation Example 15 | polyester | crepe weave | 14.8 | 14.5 | 14.4 |
| " | Preparation Example 17 | triacetate | amunzen | 12.9 | 12.9 | 13.0 |
| " | Asahi Guard AG740[1] | polyester | crepe weave | 14.8 | 14.6 | 14.6 |
| " | Polon MF-14[2] | " | georgette | 13.8 | 13.9 | 13.9 |
| " | LE-3965[3] | " | palace crepe | 14.2 | 13.9 | 13.8 |
| " | A-1160[4] | acrylic | serge | 14.9 | 14.8 | 15.0 |
| " | L-7606[5] | polyamide | muslin | 15.1 | 14.7 | 14.9 |
| " | F-171[6] | wool | poplin | 14.6 | 14.4 | 14.4 |
| " | Asahi Guard AG-740/ F-171 = 90/10 (solid weight ratio) | polyester | crepe weave | 14.8 | 14.9 | 14.6 |
| " | LE-3965/A-1160 = 80/20 (solid weight ratio) | " | georgette | 13.8 | 13.4 | 13.5 |
| " | LE-3965/F-171 = 95/5 (solid weight ratio) | " | palace crepe | 14.2 | 13.8 | 14.0 |
| cationic | Preparation Example 14 | " | crepe weave | 14.8 | 15.0 | 14.9 |
| " | Preparation Example 16 | triacetate | amunzen | 12.9 | 12.9 | 13.0 |
| " | SM-8702[7] | rayon | palace crepe | 13.9 | 13.7 | 13.7 |
| anionic | Preparation Example 18 | polyamide | muslin | 15.1 | 14.6 | 14.8 |
| " | Primar K-4[8] | " | palace crepe | 14.3 | 14.0 | 14.0 |
| " | SH-8710[9] | " | taffeta | 14.8 | 14.4 | 14.5 |
| " | Snotex 0[10] | silk | crepe | 13.8 | 13.9 | 13.8 |
| " | SH-8710/Snotex 0 = 90/10 (solid weight ratio) | wool | poplin | 14.6 | 14.5 | 14.4 |
| " | Primar K-4/SH-8710/ A-1160 = 70/25/5 (solid weight ratio) | " | serge | 14.0 | 13.7 | 13.8 |

| Note Note | Maker | Content | Solid Content (%) |
|---|---|---|---|
| [1] | Meisei Kagaku Kogyo Co., Ltd. | non-ionic aqueous fluorine resin | 14 |
| [2] | Shinetsu Kagaku Kogyo Co., Ltd. | non-ionic aqueous polysiloxane resin | 15 |
| [3] | Nihon Unicar Co., Ltd. | non-ionic aqueous polysiloxane resin | 35 |
| [4] | Nihon Unicar Co., Ltd. | non-ionic silane coupling agent | 100 |
| [5] | Nihon Unicar Co., Ltd. | polysiloxane block copolymer | 100 |
| [6] | Dainihon Ink Kagaku Kogyo Co., Ltd. | fluorine type surfactant | 20 |
| [7] | Toray Silicone Co., Ltd. | cationic aqueous polysiloxane resin | 40 |
| [8] | Nihon Acryl Kagaku Co., Ltd. | anionic aqueous acrylic resin | 40 |
| [9] | Toray Silicone Co., Ltd. | anionic aqueous polysiloxane resin | 35 |
| [10] | Nissan Kagaku Kogyo Co., Ltd. | anionic aqueous colloidal silica | 20 |

From the results shown in Tables 2 and 3, it will readily be understood that the comparative products do

EXAMPLE 2

Black-dyed fabrics of various fibers used in Example 1 were treated with color deepening agents shown in Table 4 according to the pad-dry-baking method in the same manner as described in Example 1 to examine the color deepening effect. The obtained results are shown in Table 4.

TABLE 4

| Color Deepening Agent of Present Invention | | Fiber | | L Values | |
|---|---|---|---|---|---|
| Ionic Property | Preparation Example No. | Material | Texture | untreated | pad-dry-baking method |
| cationic | 1 | polyamide | muslin | 15.1 | 13.5 |
| " | 2 | " | palace crepe | 14.3 | 13.0 |
| " | 3 | silk | crepe | 13.8 | 12.6 |
| " | 4 | " | crepe de chine | 14.5 | 13.1 |
| " | 5 | wool/acrylic = 80/20 | serge | 14.9 | 13.8 |
| anionic | 6 | polyester | georgette | 13.8 | 12.7 |
| " | 7 | " | palace crepe | 14.2 | 13.0 |
| " | 8 | polyester/triacetate = 65/36 | georgette | 13.5 | 12.5 |
| " | 9 | acrylic | serge | 14.9 | 13.9 |
| " | 10 | triacetate | amunzen | 12.9 | 12.3 |
| " | 11 | " | georgette | 13.4 | 12.6 |
| " | 12 | rayon | palace crepe | 13.9 | 13.1 |
| " | 13 | cotton | gabardine | 14.8 | 13.9 |

From the results shown in Table 4 and the results shown in Table 2 of Example 1, it will readily be understood that cationic color deepening agents of the present invention exert a prominently excellent color deepening effect on polyester, acrylic, triacetate and cotton fibers and also anionic color deepening agents of the present invention exert an excellent color deepening effect on these fibers. Anionic color deepening agents of the present invention exert a prominently excellent color deepening effect on polyamide, silk and wool fibers and also cationic color deepening agents of the present invention exert an excellent color deepening effect on these fibers.

EXAMPLE 3

A georgette weave of polyethylene terephthalate (1-denier yarns were used) was subjected to a weight-decreasing treatment with an alkali (the weight decrease ratio was 25%), and the thus-treated fabric was dipped in an aqueous solution containing 50 g/l of the color deepening agent listed in Table 5 and was squeezed so that the squeeze ratio was 80% increase. The fabric was then dried at 100° C. for 5 minutes and subjected to a fixing treatment at 180° C. for 1 minute. Then, the fabric was dyed under the conditions described below and the value L of the dyed fabric was measured. The obtained results are shown in Table 5.

Dyeing Conditions

Dye:

Kayalon Polyester Black TRF (supplied by Nihon Kayaku Co., Ltd.) (10% by weight based on fibers) pH Value adjusted to 4.5 by malic acid Disperse levelling agent (Levenol V-400 supplied by Kao Soap Co., Ltd.) (0.3 g/l)

Dyeing Operation:

The temperature was elevated at a rate of 2° C./min. and the dyeing operation was carried out at 130° C. for 30 minutes.

TABLE 5

| Color Deepening Agent | L Values |
|---|---|
| Present Invention | |
| Preparation Example 1 | 12.7 |
| Preparation Example 3 | 12.8 |
| Preparation Example 5 | 12.7 |
| Comparison | |
| Synthesis Example 10 | 14.4 |
| Synthesis Example 11 | 14.5 |
| Preparation Example 14 | 14.2 |
| Preparation Example 16 | 14.3 |
| SM-8702[1] | 14.1 |
| untreated | 14.5 |

Note
[1] see Example 1

From the results shown in Table 5, it will readily be understood that the color deepening agents of the present invention exert an excellent color deepening effect and films of the resins formed by using the color deepening agents of the present invention were not separated even by the dyeing operation.

EXAMPLE 4

A black polyester georgette fabric used in Example 1 was padded with a color deepening agent listed in Table 6 at room temperature at various color deepening agent concentrations (aqueous resin composition concentrations), and the fabric was squeezed so that the squeeze ratio was 80% increase. The treated fabric was dried at 105° C. for 5 minutes and subjected to a fixing treatment at 160° C. for 3 minutes. The treated fabric was washed under the conditions described below and the washing resistance was examined. The obtained results are shown in Table 6.

Water Washing Conditions
Washing temperature: 30° C.
Washing time: 15 minutes
Detergent: 2 g/l of New Beads (supplied by Kao Soap)
Bath ratio: 1/30

The fabric washed under the above conditions was rinsed and dried. This process was repeated 5 times.

Dry Cleaning Conditions
Solvent: perchloroethylene
Temperature: 40° C.
Time: 30 minutes The fabric was stirred under the above conditions, and the fabric was rinsed with fresh perchloroethylene and dried. This process was repeated 5 times.

TABLE 6

| | | Concentration (g/l) of Color Deepening Agent (as solids) | | | | | |
|---|---|---|---|---|---|---|---|
| | | 0 | 1.5 | 3 | 6 | 9 | 15 |
| Product of Present Invention | | | | | | | |
| Preparation Example 1 | $L_0^{(1)}$ | 13.8 | 12.7 | 12.1 | 11.9 | 12.0 | 12.3 |
| | $L_1^{(2)}$ | 13.8 | 12.7 | 12.2 | 11.8 | 12.0 | 12.5 |
| | $L_2^{(3)}$ | 13.9 | 12.6 | 12.1 | 11.7 | 12.1 | 12.4 |
| Preparation Example 3 | $L_0$ | 13.8 | 12.6 | 11.9 | 11.8 | 11.9 | 12.2 |
| | $L_1$ | 13.8 | 12.7 | 12.0 | 11.9 | 11.9 | 12.2 |
| | $L_2$ | 13.9 | 12.5 | 11.9 | 11.8 | 12.0 | 12.3 |
| Preparation Example 5 | $L_0$ | 13.8 | 12.5 | 11.7 | 11.7 | 11.8 | 12.0 |
| | $L_1$ | 13.8 | 12.6 | 11.7 | 11.6 | 11.9 | 12.1 |
| | $L_2$ | 13.9 | 12.6 | 11.8 | 11.6 | 11.9 | 12.1 |
| Comparative Products | | | | | | | |
| Synthesis Example 10 | $L_0$ | 13.8 | 13.7 | 13.5 | 13.5 | 13.6 | 13.7 |
| | $L_1$ | 13.8 | 13.9 | 13.8 | 13.7 | 13.8 | 13.9 |
| | $L_2$ | 13.9 | 13.8 | 13.8 | 13.8 | 13.9 | 13.9 |
| Preparation Example 16 | $L_0$ | 13.8 | 13.5 | 13.4 | 13.3 | 13.3 | 13.6 |
| | $L_1$ | 13.8 | 13.9 | 13.8 | 13.7 | 13.7 | 13.8 |
| | $L_2$ | 13.9 | 13.7 | 13.8 | 13.7 | 13.7 | 13.9 |
| SM8702[4] | $L_0$ | 13.8 | 13.8 | 13.7 | 13.7 | 13.5 | 13.5 |
| | $L_1$ | 13.8 | 13.9 | 13.7 | 13.8 | 13.7 | 13.8 |
| | $L_2$ | 13.9 | 13.8 | 13.8 | 13.8 | 13.7 | 13.9 |
| SM8702/A-1160[5] = 90/10 (solid weight ratio) | $L_0$ | 13.8 | 13.7 | 13.6 | 13.4 | 13.4 | 13.5 |
| | $L_1$ | 13.8 | 13.8 | 13.7 | 13.8 | 13.9 | 13.8 |
| | $L_2$ | 13.9 | 13.8 | 13.8 | 13.8 | 13.8 | 13.9 |
| SM8702/Asahi Guard AG-740[6] = 80/20 (solid weight ratio) | $L_0$ | 13.8 | 13.8 | 13.8 | 13.6 | 13.6 | 13.5 |
| | $L_1$ | 13.8 | 13.9 | 13.8 | 13.8 | 13.9 | 13.8 |
| | $L_2$ | 13.9 | 13.8 | 13.8 | 13.8 | 13.9 | 13.8 |

Note
[1] L value of treated fabric
[2] L value of treated fabric after water washing
[3] L value of treated fabric after dry cleaning
[4] see Example 1
[5] see Example 1
[6] see Example 1

From the results shown in Table 6, it will readily be understood that the color deepening agents of the present invention are prominently excellent in color deepening effect and durability, whereas the comparative color deepening agents are inferior in both color deepening effect and durability.

The embodiments of the invention in which an exclusive property or privilege is claimed are defined as follows:

1. A color deepening agent comprising (a) an aqueous resin composition obtained by radical emulsion polymerization of a monomer having a polymerizable unsaturated bond, in the presence of an anionic or a cationic polyurethane emulsion in which the polyurethane contains thermosetting reactive groups capable of forming a cross-linked structure under heating, the refractive index of a dry, heat-treated film of said aqueous resin composition being lower than 1.50, and (b) at least one material selected from the group consisting of polysiloxanes, silane coupling agents, silica, silylating agents, fluorine resins and surface active agents containing a perfluoroalkyl group.

2. A color deepening agent as set forth in claim 1, wherein the polyurethane emulsion is a cationic or anionic polyurethane emulsion obtained by reacting a urethane prepolymer having a terminal isocyanate group with a compound having an amino group, and optionally reacting the resulting reaction product with a hydrophilic agent.

3. A color deepening agent as set forth in claim 1, wherein the polyurethane emulsion is an anionic emulsion obtained by reacting a urethane prepolymer (A) having a terminal isocyanate group with an excess of a polyalkylene polyamine to form a polyurethane urea polyamine (B), then reacting the polyurethane urea polyamine with an epihalohydrin to form a first reaction product, then reacting the first reaction product with a cyclic polyvalent carboxylic acid anhydride to form a second reaction product and then mixing the second reaction product with an aqueous solution of a base to obtain an anionic self-emulsifiable polyurethane emulsion.

4. A color deepening agent as set forth in claim 1, wherein the polyurethane emulsion is a cationic emulsion obtained by reacting a urethane prepolymer (A) having a terminal isocyanate group with an excess of a polyalkylene polyamine to form a polyurethane urea polyamine (B), then reacting the polyurethane urea polyamine with an epihalohydrin to form a first reaction product, and then mixing the first reaction product with an aqueous solution of an acid to obtain a cationic self-emulsifiable polyurethane emulsion.

5. A color deepening agent as set forth in claim 1, wherein the polyurethane emulsion is a cationic emulsion obtained by reacting a urethane prepolymer (A) having a terminal isocyanate group with an excess of a polyalkylene polyamine containing at least two primary or secondary amino groups and also containing at least one functional group having the formula $-CH_2-CH(OH)-CH_2X$, wherein X is Cl or Br, to form a polyurethane urea polyamine (B), and then mixing the polyurethane urea polyamine with an aqueous solution of an acid to obtain a cationic self-emulsifiable polyurethane emulsion.

6. A color deepening agent as set forth in claim 1, wherein the polyurethane emulsion is a cationic emulsion obtained by reacting a urethane prepolymer (A) having a terminal isocyanate group with an excess of a polyalkylene polyamine containing at least two primary or secondary amino groups and also containing at least one functional group having the formula $-CH_2-CH(OH)-CH_2X$, wherein X is Cl or Br, to form a polyurethane urea polyamine (B), then reacting a part of the free amino groups of the polyurethane urea polyamine with a blocked polyisocyanate having one free isocyanate group to form a first reaction product, and then mixing the first reaction product with an aqueous solution of an acid to obtain a cationic self-emulsifiable polyurethane emulsion.

7. A color deepening agent as set forth in claim 1, wherein the polyurethane emulsion is an anionic emulsion obtained by reacting a urethane prepolymer (A) having a terminal isocyanate group with an excess of a polyalkylene polyamine containing at least two primary or secondary amino groups and also containing at least one functional group having the formula $-CH_2-CH(OH)-CH_2X$, wherein X is Cl or Br, to form a polyurethane urea polyamine (B), then reacting the polyurethane urea polyamine with a cyclic polyvalent carboxylic acid anhydride to form a first reaction product and then mixing the first reaction product with an aqueous solution of a base to obtain an anionic self-emulsifiable polyurethane emulsion.

8. A color deepening agent as set forth in claim 1, wherein the polyurethane emulsion is an anionic emulsion obtained by reacting a urethane prepolymer (A) having a terminal isocyanate group with an excess of a polyalkylene polyamine containing at least two primary or secondary amino groups and also containing at least one functional group having the formula —CH$_2$—CH(OH)—CH$_2$X, wherein X is Cl or Br, to form a polyurethane urea polyamine (B), then reacting a part of the free amino groups of the polyurethane urea polyamine with a blocked polyisocyanate having one free isocyanate group to form a first reaction product, then reacting the first reaction product with a cyclic polyvalent carboxylic acid anhydride to form a second reaction product and then mixing the second reaction product with an aqueous solution of a base to obtain an anionic self-emulsifiable polyurethane emulsion.

9. A color deepening agent as set forth in claim 3 or claim 4, wherein the polyalkylene polyamine is diethylene triamine or triethylene tetramine.

10. A color deepening agent as set forth in claim 6 or claim 8, wherein the blocking agent for forming said blocked polyisocyanate is ε-caprolactam or methylethyl ketone oxime.

11. A color deepening agent as set forth in claim 3, claim 7 or claim 8, wherein the cyclic polyvalent carboxylic acid anhydride is maleic anhydride, succinic anhydride or phthalic anhydride.

12. A color deepening agent as set forth in claim 1, wherein said material (b) is a polysiloxane, a silane coupling agent or silica.

13. A color deepening agent as set forth in claim 1, wherein said material (b) is a fluorine resin or a surface active agent containing a perfluoroalkyl group.

14. A color deepening agent as set forth in claim 1 wherein said monomer having an unsaturated bond is selected from the group consisting of fluorinated acrylic acid esters, fluorinated methacrylic acid esters, vinyl ether monomers, α,β-unsaturated carboxylic acid esters and α,β-unsaturated compounds.

15. A color deepening agent as set forth in claim 1 in which the amount of said polymerizable monomer is from 99.5 to 2% by weight and the amount of polyurethane, calculated as the solids, is correspondingly from 0.5 to 98% by weight, to make 100% by weight of said monomer and said polyurethane.

16. A color deepening agent as claimed in claim 15, wherein the ratio by weight of said aqueous resin composition (a), calculated as the solids, to said material (b) is in the range of 98/2 to 10/90, and wherein said material (b) is at least one compound selected from the group consisting of said polysiloxanes, said silylating agents and said fluorine resins.

17. A color deepening agent as claimed in claim 16, wherein said ratio is in the range of from 95/5 to 20/80.

18. A color deepening agent as claimed in claim 15, wherein the ratio by weight of said aqueous resin composition (a), calculated as the solids, to said material (b), calculated as the solids, is in the range of from 99.9/0.1 to 20/80, and wherein said material (b) is at least one compound selected from the group consisting of said silane coupling agents, said silica, and said surface active agents containing a perfluoroalkyl group.

19. A color deepening agent as claimed in claim 18, wherein said ratio is in the range of 99/1 to 50/50.

20. A color deepening agent as claimed in claim 1, wherein said material (b) is selected from the group consisting of a mixture of said polysiloxane and said fluorine resin, a mixture of said polysiloxane and said surface active agent containing a perfluoroalkyl group and a mixture of said polysiloxane and said silane coupling agent.

21. A color deepening agent as claimed in claim 1, wherein said polysiloxanes are selected from the group consisting of: dimethyl-polysiloxane, methylhydrodiene-polysiloxane, methylphenylpolysiloxane, epoxymodified polysiloxanes, alkyl-modified polysiloxanes, amino-modified polysiloxanes, carboxyl-modified polysiloxanes, alcohol-modified polysiloxanes, fluorine-modified polysiloxanes, polyether-modified polysiloxanes, epoxypolyether-modified polysiloxanes, alkylaralkylpolyether-modified polysiloxanes, and mixtures and copolymers thereof; said silane coupling agents are selected from the group consisting of vinyltrichlorosilane, vinyltriethoxysilane, vinyltris-(β-methoxyethoxy)silane, γ-glycidoxypropyltrimethoxysilane, γ-methacryloxypropyltrimethoxysilane, N-β-(aminoethyl)-γ-aminopropyltrimethoxysilane, N-β-(aminoethyl)-γ-aminopropylmethyldimethoxysilane, γ-chloropropyltrimethoxysilane, γ-mercaptopropyltrimethoxysilane, γ-aminopropyltriethoxysilane, and carbamylaminopropyltrimethoxysilane, and mixtures thereof; said silicas are selected from the group consisting of liquid colloidal silica and powdery silica; said silylating agents are selected from the group consisting of chlorosilanes, ester silanes, silazanes and siloxanes; said fluorine resins are selected from the group consisting of polymers having a long-chain fluorocarbon on a side chain, polytetrafluoroethylene, polyvinyl fluoride, polyvinylidene fluoride, a hexafluoropropylenetetrafluoroethylene copolymer, a chlorotrifluoroethylenevinylidene chloride copolymer, and mixtures thereof; and said fluorine type surface active agents are selected from the perfluoroalkylsulfonic acid salts, perfluoroalkylcarboxylic acid salts, perfluoroalkylethylene oxide adducts, perfluoroalkyltrimethyl ammonium salts, perfluoroalkylphosphoric acid esters, oligomers containing a perfluoroalkyl group and a hydrophilic group, oligomers containing a perfluoroalkyl group and an oleophilic group, oligomers containing a perfluoroalkyl group, a hydrophilic group and an oleophilic group, and urethanes containing a perfluoroalkyl group and an oleophilic group, and mixtures thereof.

22. A color deepening agent as claimed in claim 1, wherein the concentration of said color deepening agent is in the range of 1.5 to 15 grams of solids/liter.

23. A color deepening agent as claimed in claim 1, wherein the concentration of said color deepening agent is in the range of 3.0 to 9.0 grams of solids/liter.

* * * * *